(12) United States Patent
Shen et al.

(10) Patent No.: US 10,235,423 B2
(45) Date of Patent: Mar. 19, 2019

(54) RANKING SEARCH RESULTS BASED ON ENTITY METRICS

(71) Applicants: Google Inc., Mountain View, CA (US); Hongda Shen, Shanghai (CN)

(72) Inventors: Hongda Shen, Shanghai (CN); David Francois Huynh, San Francisco, CA (US); Grace Chung, New South Wales (AU); Chen Zhou, Shanghai (CN); Yanlai Huang, Shanghai (CN); Guanghua Li, Shanghai (CN)

(73) Assignee: GOOGLE LLC, Mountain View, CA (US)

( * ) Notice: Subject to any disclaimer, the term of this patent is extended or adjusted under 35 U.S.C. 154(b) by 403 days.

(21) Appl. No.: 14/651,332

(22) PCT Filed: Dec. 12, 2012

(86) PCT No.: PCT/CN2012/086438
§ 371 (c)(1),
(2) Date: Jun. 11, 2015

(87) PCT Pub. No.: WO2014/089776
PCT Pub. Date: Jun. 19, 2014

(65) Prior Publication Data
US 2015/0331866 A1 Nov. 19, 2015

(51) Int. Cl.
*G06F 17/30* (2006.01)
*G06F 7/00* (2006.01)

(52) U.S. Cl.
CPC .... *G06F 17/3053* (2013.01); *G06F 17/30554* (2013.01); *G06F 17/30861* (2013.01)

(58) Field of Classification Search
CPC ......... G06F 17/30864; G06F 17/30867; G06F 17/30675; G06F 17/30696; G06Q 30/02
USPC ........................................................ 707/723
See application file for complete search history.

(56) References Cited

U.S. PATENT DOCUMENTS

| | | | |
|---|---|---|---|
| 2005/0060312 A1* | 3/2005 | Curtiss | G06F 17/30864 |
| 2008/0033939 A1* | 2/2008 | Khandelwal | G06F 17/30707 |
| 2009/0077059 A1 | 3/2009 | Torres et al. | |
| 2009/0144609 A1* | 6/2009 | Liang | G06F 17/21 715/230 |
| 2010/0250523 A1 | 9/2010 | Jin et al. | |
| 2012/0095996 A1* | 4/2012 | Durrant | G06F 17/30528 707/728 |
| 2013/0218866 A1* | 8/2013 | Qian | G06F 17/30696 707/714 |

OTHER PUBLICATIONS

PCT International Search Report and Written Opinion dated Sep. 19, 2013 in corresponding PCT Application No. PCT/CN2012/086438 filed Dec. 12, 2012 (10 pages).

* cited by examiner

*Primary Examiner* — Usmaan Saeed
*Assistant Examiner* — Raquel Perez-Arroyo
(74) *Attorney, Agent, or Firm* — Middleton Reutlinger

(57) ABSTRACT

Methods, systems, and computer-readable media are provided for ranking search results. A search system may determine several metrics based on search results. The search system may determine weights for the metrics, wherein the weights are based in part on the type of entity included in the search. The search system may determine a score by combining the metrics and the weights. The search system may rank search results based on the score.

27 Claims, 8 Drawing Sheets

RANKING SEARCH RESULTS BASED ON ENTITY METRICS

CROSS-REFERENCE TO RELATED APPLICATIONS

This application is a national phase application of International Application No. PCT/CN2012/086438, filed Dec. 12, 2012, the content of which is incorporated herein by reference.

BACKGROUND

The present disclosure relates to ranking search results. Conventional techniques for ranking search results include alphabetical ordering and keyword matching.

SUMMARY

Methods, systems, and computer-readable media are provided for ranking search results.

In some implementations, a computer implemented method is provided. A plurality of metrics is determined associated with a search result obtained from a knowledge graph, wherein the plurality of metrics is indicative of the relevance of the search result, and the plurality of metrics is determined at least in part from the knowledge graph. An entity type associated with the search result is determined, wherein the entity type is determined at least in part from the knowledge graph. A weight is determined for each metric of the plurality of metrics based at least in part on the entity type. A score is determined based on the plurality of metrics and the weight for each metric of the plurality of metrics. Search results are ranked based at least in part on the score.

In some implementations, a system comprising one or more computers is configured to perform operations. The system determines a plurality of metrics associated with a search result obtained from a knowledge graph, wherein the plurality of metrics is indicative of the relevance of the search result, and the plurality of metrics is determined at least in part from the knowledge graph. The system determines an entity type associated with the search result, wherein the entity type is determined at least in part from the knowledge graph. The system determines a weight for each metric of the plurality of metrics based at least in part on the entity type. The system determines a score based on the plurality of metrics and the weight for each metric of the plurality of metrics. The system determines search results based at least in part on the score.

In some implementations, a non-transitory computer-readable medium is provided, the computer readable medium having computer program instructions recorded thereon. Instructions include determining a plurality of metrics associated with a search result obtained from a knowledge graph, wherein the plurality of metrics is indicative of the relevance of the search result, and the plurality of metrics is determined at least in part from the knowledge graph. Instructions include determining an entity type associated with the search result, wherein the entity type is determined at least in part from the knowledge graph. Instructions include determining a weight for each metric of the plurality of metrics based at least in part on the entity type. Instructions include determining a score based on the plurality of metrics and the weight for each metric of the plurality of metrics. Instructions include ranking search results based at least in part on the score.

DETAILED DESCRIPTION OF THE FIGURES

Figure 1:
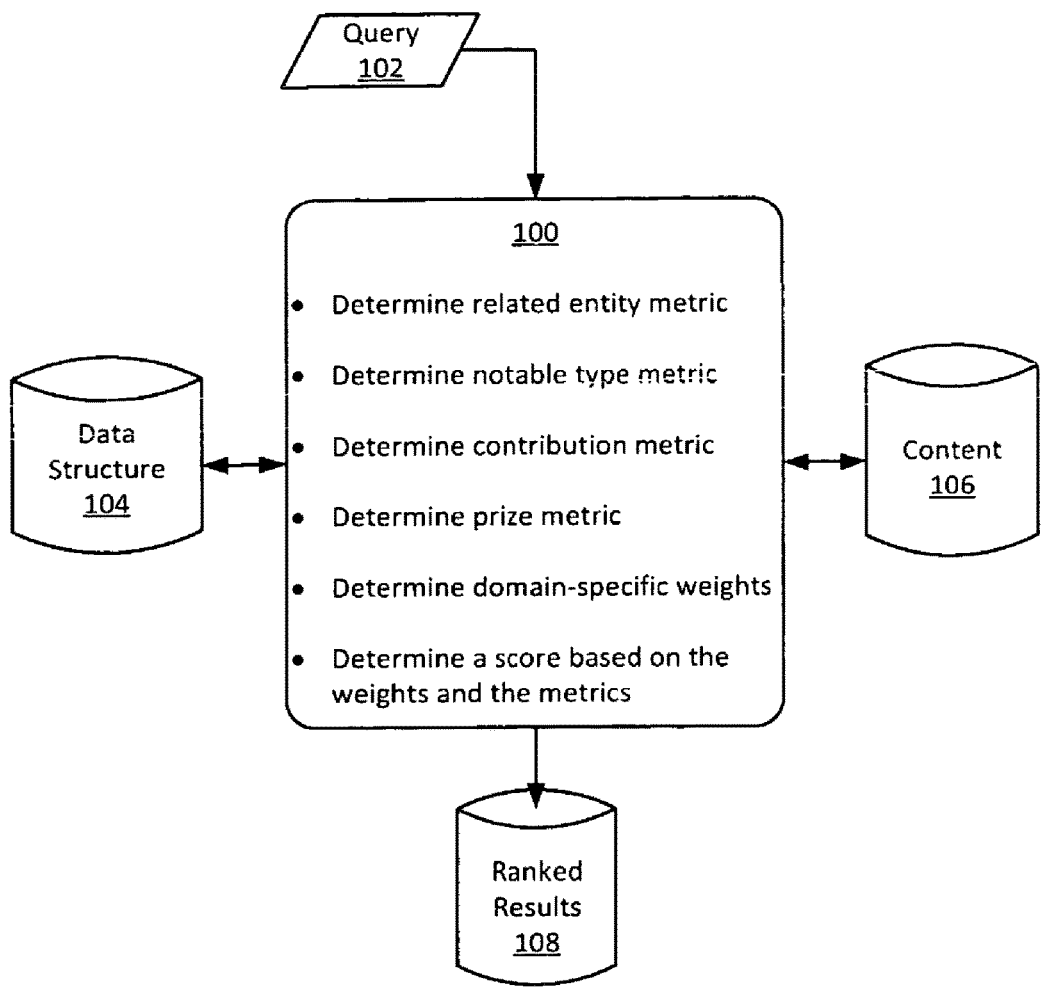
FIG. 1 shows an information flow diagram in accordance with some implementations of the present disclosure.

In some implementations, a search system retrieves a set of search results, and presents those results to a user. For example, an internet search engine retrieves a set of links to webpages based on a received search query. Ranking and ordering of the search results to identify and highlight the most relevant data increases the usefulness of the search system. A search system may use any number of techniques to rank search results. In some implementations, the search system determines any number of metrics for each search result in a set of search results, and combines the metrics to determine a score. The search system uses the score to rank the search results, and the ranking may be used to order a list of search results, to identify a portion of the search results for present, to determine further processing steps, for any other suitable purpose, or any combination thereof. In some implementations, the system makes use of four particular metrics: a relatedness metric, a notable entity type metric, a contribution metric, and a prize metric.

As used herein, entity types may include organizational structures, groupings, and defining characteristics associated with an entity. For example, the entity node "George Washington" may be connected to the entity type node "President." As used herein, an entity reference is an identifier, e.g., text; or other information that refers to an entity. For example, an entity may be the physical embodiment of George Washington, while an entity reference is an abstract concept that refers to George Washington. Where appropriate, based on context, it will be understood that the term entity as used herein may correspond to an entity reference, and the term entity reference as used herein may correspond to an entity.

In some implementations, search results are retrieved from a data structure. In some implementations, the data structure also contains data regarding relationships between topics, links, contextual information, and other information related to the search results that the system may use to determine the ranking metrics. For example, the data structure may contain an unordered list of movies, along with the awards and reviews for each respective movie. The search system may use the awards and reviews to determine a ranking of the list, and may present the search results using that ranking.

An illustrative metric is, for example, a relatedness metric. In some implementations, the relatedness metric is determined based on the co-occurrence of an entity reference contained in a search query with the entity type of the entity reference on web pages. An entity type may be a defining characteristic and/or categorization of an entity. For example, where the search query contains the entity reference"Empire State Building," which is determined to be of the entity type"Skyscraper," the co-occurrence of the text "Empire State Building" and "Skyscraper" in webpages may determine the relatedness metric.

Another illustrative metric is, for example, a notable entity type metric. In some implementations, the value of the notable entity type metric is a global popularity metric divided by a notable entity type rank. The notable entity type rank indicates the position of an entity type in a notable entity type list.

Another illustrative metric is, for example, a contribution metric. In some implementations, the contribution metric is based on critical reviews, fame rankings, and other information. In some implementations, rankings are weighted such that the highest values contribute most heavily to the metric.

Another illustrative metric is, for example, a prize metric. The prize metric is based on an entity's awards and prizes. For example, a movie may have been awarded a variety of awards such as Oscars and Golden Globes, each with a particular value. In some implementations, the prize metric is weighted such that the highest values contribute most heavily to the metric.

In some implementations, a score is determined by combining the metrics. In some implementations, the system uses a weighted combination of the metrics, where weights are assigned to each of the metrics based on the category or entity type of search results. In some implementations, search results are ranked based on the score. In an example, search results are presented in an order based on the ranking. In another example, further processing of search results, for example to compare with a second set of search results, is performed based on the ranking.

It will be understood that the above described metrics and to combine the metrics are merely examples and that the search system may use any suitable metric or combination of metrics to rank search results. It will also be understood that the search system may use any suitable weighting technique to combine metrics.

The following description and accompanying FIGS. 1-8 provide additional details and features of some implementations of the search system.

FIG. 1 shows an information flow diagram in accordance with some implementations of the present disclosure. The information flow diagram includes processing block 100, query block 102, data structure block 104, content block 106, and ranked results block 108. In some implementations, the search system uses information from data structure block 104, content block 106, other sources not shown, or any combination thereof, to generate an output to ranked search results block 108, based on a query received in query block 102.

Processing block 100 includes processing steps for determining a score used to rank search results. Details of the processing steps are discussed below in reference to FIG. 2. It will be understood that the particular steps listed in processing block 100 are merely an example and that steps may be added, removed, repeated, changed, otherwise suitably modified, or any combination thereof.

Query block 102 includes a search query provided to processing block 100. In some implementations, the search query is a query received from a user. In some implementations, search queries are directed towards Internet searches, text searches, image searches, database searches, searches of any other suitable index or collection of content, or any combination thereof. In some implementations, a search query may be used to query a data structure. In some implementations, the search query is text-based, image-based, audio-based, of any other suitable format, or any combination thereof. In an example, the search query is a text-based search for webpages. In another example, the search query is an image-based search for images.

In some implementations, search results related to the search query are retrieved in search query block 102, are retrieved in processing block 100, are retrieved in any other suitable process, or any combination thereof. In an example, search results are retrieved based in part on data stored in a data structure, such as data structure block 104. In another example, search results from a search of the internet are retrieved in search query block 102 and provided to processing block 100.

Data structure block 104 includes a data structure containing structured or otherwise organized, information. In some implementations, search results are retrieved from data structure block 104. In some implementations, metrics are determined based on data stored in data structure block 104. In some implementations, data structure block 104 contains a data graph, a database, an index, any other suitable collection of content, or any combination thereof. In an example, data structure block 104 includes a collection of data stored as nodes and edges in a graph structure. In some implementations, data structure block 104 includes a knowledge graph. In some implementations, a knowledge graph includes data organized in a graph containing nodes and edges. The data of a knowledge graph may include states about relationships between things and concepts, and those statements may be represented as nodes and edges of a graph. The nodes of a knowledge graph each contain a piece or pieces of data and the edges represent relationships between the data contained in the nodes that the edges connect. A particular implementation of a knowledge graph, is described below in FIGS. 4-6.

In some implementations, data structure block 104 contains data regarding entities. An entity is a thing or concept that is singular, unique, well-defined and distinguishable. For example, an entity may be a person, place, item, idea, abstract concept, concrete element, other suitable thing, or any combination thereof. For example, the color "Blue," the city "San Francisco," and the imaginary animal "Unicorn" may each be entities.

In some implementations, data structure block 104 contains data regarding entities references and/or entity types. Entity types may include organizational structures, groupings, and defining characteristics associated with an entity reference. For example, the entity reference node "George Washington" may be connected to the entity type node "President." As used herein, an entity reference is an identifier, e.g., text, or other information that refers to an entity. For example, an entity may be the physical embodiment of George Washington, while an entity reference is an abstract concept that refers to George Washington. Where appropriate, based on context, it will be understood that the term entity as used herein may correspond to an entity reference, and the term entity reference as used herein may correspond to an entity.

In some implementations, the data stored in data structure block 104 is divided into domains. In some implementations, domains are groups or categorizations of entity types. In some implementations, elements of a domain share common characteristics, properties, traits, categorization techniques, any other suitable parameters, or any combination thereof. In an example, domains include "Books," "Film," "People," and "Places." Entity types within the domain "Movies" may include: "Actor," "Director," and "Filming Location."

In some implementations, on or more metrics are determined in processing block 100 for each search result. In some implementations, the weights are combined by a weighted technique. In some implementations, the weights used may be specific to the domain of the search results. For example, the search system may place the highest weight on the prize metric for entities associated with the "Film" domain and may place the highest weight on a contribution metric for entities associated with the "Book" domain. In some implementations, domain-specific weights are stored in data structure block 104, in processing block 100, in any other suitable storage, or any combination thereof. Content block 106 includes web sites and other content. In an example, content block 106 includes webpages and other content on the internet containing text, images, videos, links, other suitable data, or any combination thereof. In some implementations, webpages block 106 includes information from a database, private intranet, public network, private network, any other suitable collection of information, or any combination thereof. In some implementations, processing block 100 uses information in content block 106 to determine metrics used to rank search results. In an example, a relatedness metric, as described below, is determined based on the co-occurrence of particular words in the text of web sites.

In some implementations, processing block 106 includes an index, list, table, or other suitable data determined based on the content of content block 106. In an example, processing block 100 includes an index of webpages from content block 110. In some implementations, processing block 100 uses an index based on the content of content block 106 to determine search results in response to, for example, a search query from query block 102.

Ranked results block 108 includes the output of processing block 100. In some implementations, processing block 100 generates a score from several metrics and uses the score to rank search results based on query block 102, data structure block 104, webpages block 106, any other suitable information, or any combination thereof. In some implementations the ranked search results are used to order search results in a list for presentation. In some implementations, ranked search results are used in further processing steps. In an example, the ranked results may be compared with another set of ranked results. In another example, the ranking may be combined with another ranking or metric to order search results for presentation. In some implementations, presenting the search results of ranked results block 108 may include displaying results on a display screen, using a speaker or other audio device, using any other suitable output device, or any combination thereof.

It will be understood that ranking search results may be distinct from ordering search results for presentation. For example, the ranking of search results may be used for selecting a user interface, for suggesting related search queries, for suggesting related collections of search results, for ordering a list or grid of search results, for any other suitable purpose, or any combination thereof.

Figure 2:
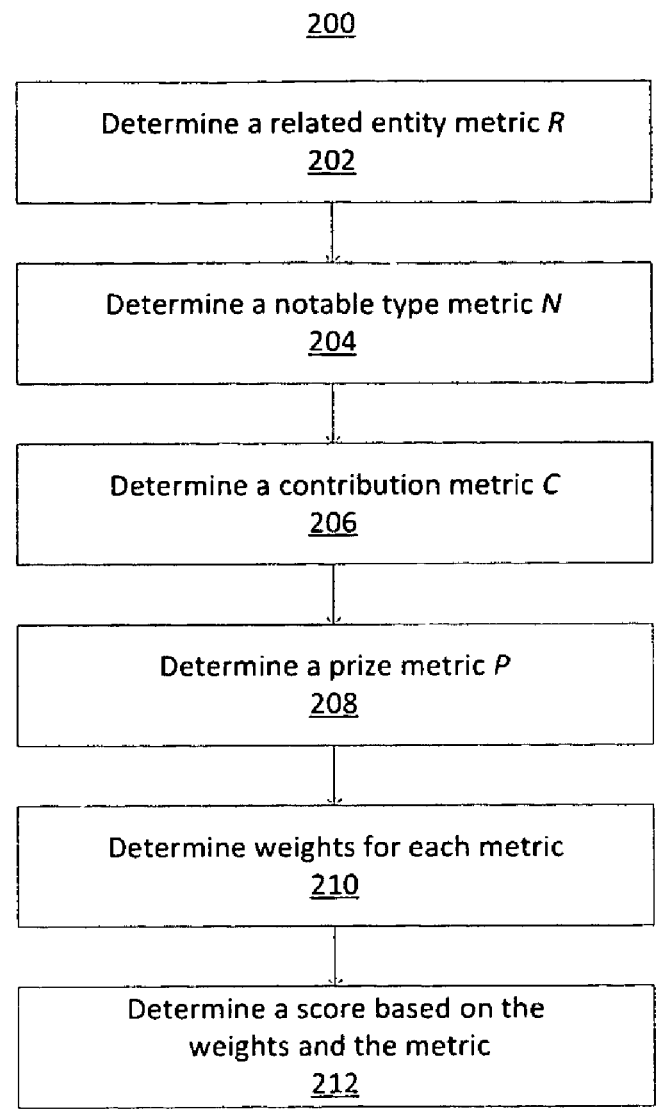
FIG. 2 shows a flow diagram including illustrative steps for ranking search results in accordance with some implementations of the present disclosure.

FIG. 2 shows flow diagram 200 including illustrative steps for ranking search results in accordance with some implementations of the present disclosure.

In step 202, the search system determines a relatedness metric R. In some implementations, the relatedness metric is determined based in part on the co-occurrence of particular words on webpages. In some implementations, processing block 100 of FIG. 1 accesses webpages of webpage block 106 of FIG. 1 to determine a relatedness metric R.

In some implementations, the search system determines a relatedness metric by identifying an entity reference and a related entity reference. For example, the frequency with which two words or blocks of text appear near on another in a collection of webpages may be used to determine a relatedness metric R. In some implementations, the entity reference is associated with a received search query. In some implementations, the entity reference and the related entity reference are included in a data structure such as data structure block 104 of FIG. 1. In some implementations, the search system determines a related entity reference metric based on the co-occurrence of the entity reference and the related entity reference among webpages such as webpages of webpage block 106 of FIG. 1. In some implementations, the relatedness metric R is equal to the co-occurrence. In some implementations, the search system may scale, normalize, weight, combine with other data, or otherwise adjust a co-occurrence to determine a relatedness metric R.

An illustrative expression for determining co-occurrence $C(E, RE_j)$ is shown by Eq. 1:

$$C(E, RE_j) = \frac{P(E, RE_j)}{P(E)} \quad (1)$$

in which P(E) is the probability of finding entity reference E in a text corpus, e.g. one or more webpages, and $P(E, RE_j)$ is the probability of finding both the entity reference E and the related entity reference $RE_j$, indexed by index j, in the text corpus. Another illustrative expression for determining co-occurrence $C(E, RE_j)$ is shown by Eq. 2:

$$C(E, RE_j) = \frac{N(E, RE_j)}{N(E) + N(RE_j) - N(E, RE_j)} \quad (2)$$

in which N(E) is the number of instances of entity reference E in a text corpus, e.g. one or more webpages, $N(RE_j)$ is the number of instances of related entity reference $RE_j$ in the text corpus, e.g. one or more webpages, and $N(E, RE_j)$ is the number of instances of both the entity reference E and the related entity reference $RE_j$ the text corpus. In some implementations, the one or more processors may normalize, scale, shift, or otherwise alter the co-occurrence value to convert them into relatedness metrics. It will be understood that the aforementioned equations are merely an example and that any suitable equation, technique, other suitable processing, or any combination thereof, may be used to determine a co-occurrence value, a relatedness metric, or any combination thereof.

In step 204, the search system determines a notable entity typemetric N. In some implementations, a notable entity typemetric includes information related the notability of a search result. In some implementations, a notable entity typemetric N may be determined as:

$$N = \frac{G}{n} \quad (3)$$

where G is a global popularity metric and n is a notable entity type rank. In some implementations, the global popularity metric G includes, for example, a ranking value based on aggregated user selections of entity references and/or data associated with entity references. In an example, a global popularity metric includes the likeliness that a particular search result generated in response to a similar search query will be selected by a random user for further browsing. The global popularity metric may also include the number of links to a particular search result, the number of links from a particular search result, the number of visits to a particular search result, any other suitable statistical information related to site visits and connectedness, or any combination thereof. In some implementations, the global popularity metric may include a ranking that would be used to order results by a web search engine.

In some implementations, notable entity type rank n includes a ranking of entity types within a domain. For a domain, the collection of types may be ranked by their notability, popularity, frequency of occurrence, any other suitable ranking, or any combination thereof. For example, "short stories," "novels," and "non-fiction" may be entity types in the domain "books." The entity types may be ranked in the order "novels" followed by "non-fiction" followed by "short stories" assuming that novels are the most notable and short stories are the least notable. An entity type may be assigned the notable entity type rank n when it is in the position in the ranked list. For example, the fifth item in a list may be assigned the rank n. In some implementations, more complex relationships between one or more ranked lists and the notable entity type rank n may be used. For example, the rank may be scaled, normalized, combined with other metrics, determined by any other suitable technique, or any combination thereof.

In an example, a ranking list for entity types in the "Book" domain may place "Fiction Novel" first and "Short story" eighth. A search result for a particular fiction novel may have a global popularity metric of 50, a notable entity type rank of 1, and thus a notable entity typemetric $$N = \frac{G}{n} = \frac{50}{1} = 50.$$

A particular short story may have global popularity metric 20 and notable entity type rank 8, and thus have notable entity typemetric $$N = \frac{G}{n} = \frac{20}{8} = 2.5.$$

In some implementations, where entities are associated with more than one entity type, a notable entity type metric may be determined based on a combination of the entity types, based on the more popular entity type, based on the least popular entity type, based on any other suitable technique, or any combination thereof.

In some implementations, rankings are based on popularity, relevance, frequency, user selections of entities and data associated with entities, system settings, predetermined parameters, any other suitable information, or any combination thereof. For example, the entity types within a domain may be ranked such that more frequently occurring entity types are ranked higher than less frequently occurring entity types. In some implementations, rankings are stored in a data structure such as data structure block 104 of FIG. 1. In some implementations, rankings of entity types may be stored in any suitable list, table, grid, other suitable data structure, or any combination thereof.

In step 206, the search system determines an objective contribution metric C. In some implementations, the contribution metric C may relate to rankings, reviews, and other values associated with entities and search topics. In some implementations, objective contribution metric C includes information related to an entity reference's popularity, performance, relevance, importance, quality, any other suitable characterization, or any combination thereof. For example, a restaurant may be rated by a newspaper reviewer on a scale of 0 to 3 stars. Information related to the characterizations may be stored in a data structure, for example, a data structure such as data structure block 104 of FIG. 1. In some implementations, information may be stored in a data structure, table, list, grid, by any other suitable technique, or any combination thereof. In some implementations, multiple contribution values may be combined to produce a contribution score associated with a particular entity reference or topic.

In some implementations, characterizations and other content related to a contribution metric are determined using information on webpages. In an example, contribution metrics for entities in the "movies" domain are determined using reviews on several predetermining and/or automatically identified movie review webpages. In some implementations, webpages are included in webpage block 105 of FIG. 1. In some implementations, rankings are combined based on the number of reviews, the popularity of the particular website, predetermined parameters, system settings, any other suitable parameter, or any combination thereof. In an example, a contribution metric for U.S. Presidents may be determined based on rankings published by various news and political research organizations. In another example, a contribution metric for books may be based on a best-seller list. In some implementations, values from difference sources may contribute to the contribution score in different proportions. For example, the search system may combine professional critic reviews and user reviews of restaurants, giving more weight to the professional reviews and less weight to the user reviews. It will be understood that the aforementioned information sources are merely an example and that any suitable source of information may be used. For example, information for determining a contribution metric may include social media, news sources, research publications, books, magazines, professional and user reviews on commerce websites, e.g. Amazon product reviews, professional and user reviews on dedicated reviewing sites, e.g. restaurant reviews on Yelp, user reviews on industry or domain specific sites, e.g. movie reviews on IMDB, any other suitable source of information, or any combination thereof. In some implementations, sources are predetermined, for example, a search system retrieves movie review rankings from a known website. In some implementations, a search system identifies content on a previously unknown website. In an example, the application identifies content on a previously unknown website as being a movie review, and retrieves rankings from that content.

In some implementations, a fame metric may be included in contribution metric C. In some implementations, a fame metric includes a summation of contribution values for individual contributions associated with a particular entity reference. For example, the fame metric of a movie actor may include a summation of the contribution metrics of that actor's movies.

In some implementations, the contribution metric may include a weighting function:

$$C = \frac{\sum_{n=0}^{k} S_n \beta^n}{\sum_{n=0}^{k} \beta^n} \quad where \beta|[0.1] \quad (4)$$

where $S_n$ is a review value of a particular contribution n of a set of k contributions, $\beta$ is a constant that is an element of the inclusive set 0 to 1, and n is a ranking of the particular contributions. This definition of C is expressed such that the contribution metric C is equal to the quotient of dividing the summation of the product of each individual contribution multiplied by the constant $\beta$ raised to the power of that contributions rank in an ordered list, by the summation of constant $\beta$ raised to each power of contributions rank in an ordered list. In some implementations, the ordered list of S values is ordered from the highest reviewed contributions to the lowest reviewed contributions and notated $S_0$, $S_1$, $S_2$, ..., $S_k$. In some implementations, the equation for C includes a weighting function, such that a relatively higher weight is applied to a contributor's highly reviewed contributions and a relatively lower weight is applied to a contributor's lower reviewed contributions. For example, an actor's highest rated movies will have the greatest contribution to that actor's fame metric, while low ranking movies will have little impact. It will be understood that this equation and technique are merely an example and that the search system may use any suitable technique, weighted equation, unweighted equation, or combination thereof, for computing a fame metric and/or a contribution metric.

In step 208, the search system determines a prize metric P. In some implementations, prize metric P includes information related to an entity reference having been awarded a prize, award, contest, medal, any other suitable acknowledgement, or any combination thereof. For example, a movie may have received an award such as an Academy Award or Golden Globe. In another example, a book may have received a Pulitzer or a Man Booker prize. In another example, a person may have received a Nobel prize or military medal. In some implementations, a domain may include a set of award values associated with particular awards, categories of awards, and competitions. For example, the movie domain may include metrics associated with particular movie awards. For example, an Academy Award for best movie may be associated with a higher prize metric that an Academy Award nomination for best supporting actor, which may be associated with a higher value than a People's Choice award for cinematography. Particular values may be determined based on system settings, aggregated user selections of entity references and/or data associated with entity references, any other suitable parameters, or any combination thereof.

In some implementations, the prize metric includes a weighting function similar to the weighting function applied to the contribution metric above. In some implementations, the prize metric may include a weighting function:

$$P = \frac{\sum_{n=0}^{k} A_n \delta^n}{\sum_{n=0}^{k} \delta^n} \quad where \delta|[0.1] \quad (5)$$

where $A_n$ is be the prize metric of a particular prize n of a set of k prize, $\delta$ is a constant that is an element of the inclusive set 0 to 1, and n is a ranking of the particular prizes. This definition of P is expressed such that the prize metric P is equal to the quotient of dividing a summation of the product of each individual prize multiplied by the constant $\delta$ raised to the power of that contribution's rank in an ordered list, by the summation of constant $\delta$ raised to each power of prize rank in an ordered list. The ordered list of P values may be arranged such that the prizes are ordered from highest value to lowest value and notated $A_0$, $A_1$, $A_2$, ..., $A_k$. In some implementations, the equation for P applies a relatively higher weight to an entity reference's more significant awards and a relatively lower weight to a less significant awards. In some implementations, significance values are determined based on a popularity metric, predetermined information, historical information, aggregated user selections of entity references and/or data associated with entity references, any other suitable parameters, or any combination thereof. In an example, a movie's prize with the highest significance will have the largest impact on its P, while a less significant prize will have a less significant impact.

In some implementations the search system determines prize values and the prize metric based on content. In an example, a search system may retrieve prize results from a predetermined website. In another example, a search system may automatically identify prizes on a previously unknown website, and retrieve those rankings.

In step 210, the search system determines weights associated with each metric. In some implementations, weights are specific to a domain in a data structure. For example, a search system may use one set of weights for entities of the "Movie" domain, and another set of weights for entities of the "People" domain. In an example, the prize metric P may be more useful in determining the relevance of a movie than the relevance of a person where there are fewer prizes awarded. Thus, the weight associated with prize metric P in the movie domain may be greater than the weight associated with prize metric P in the people domain. Similarly, the notable entity type metric N may be more meaningful and thus assigned a greater weight for entities of the "People" domain and less useful for entities as assigned a lesser weight for entities of the "Movie" domain, because the entity type of a movie, e.g., genre, does not necessarily give much information about its comparative relevance, while the entity type of a person, e.g., U.S. President, gives more information as to comparative relevance.

In some implementations, a weight is determined for each metric. Weights may include a single scalar value, more complex weighting functions, positive numbers, negative numbers, zero, any other suitable value or function, or any combination thereof. In an example, a metric may be assigned a weight of 1 when the system assigns it a 100% contribution to the score, and may be assigned a weight of 0 a metric is assigned a 0% contribution to the score. In another example, where a particular metric is not used in a domain, its domain-specific weight may be 0. In another example, where the high value of a metric is considered detrimental to the relevance of an entity reference in a particular domain, its domain-specific weight may be negative. In some implementations, the search system determines a weight a associated with the related entities metric R, a weight b associated with the notable entity typemetric N, a weight c associated with the contribution metric C, and a weight d associated with the prize metric P.

In some implementations, the weights are determined experimentally, may be based on system settings, predetermined parameters, aggregated user selections of entity references and/or data associated with entity references, any other suitable parameters, or any combination thereof. In some implementations, the weights may be predetermined in the search system and retrieved in response to receiving a search query.

In step 212, the search system determines a score based on the weights and the metrics. For example, a score S may be determined as:

$$S=(a|R)+(b|N)+(C|C)+(d|P) \qquad (6)$$

such that the score is a summation of the products of the metrics and their associated weights. It will be understood that this particular calculation of a score is merely an example and that any suitable calculation may be used. For example, the determination for S may include a different weighting function. In another example, the determination for S may include multiply dependent weights and metrics, such that the impact of the value of one weight or metric is dependent upon the value of another weight or metric. The equation may include any suitable mathematical technique such as addition, subtraction, multiplication, division, integrals, derivatives, summations, products, exponents, dot products, cross products, matrices, any other suitable technique, or any combination thereof.

Figure 3:
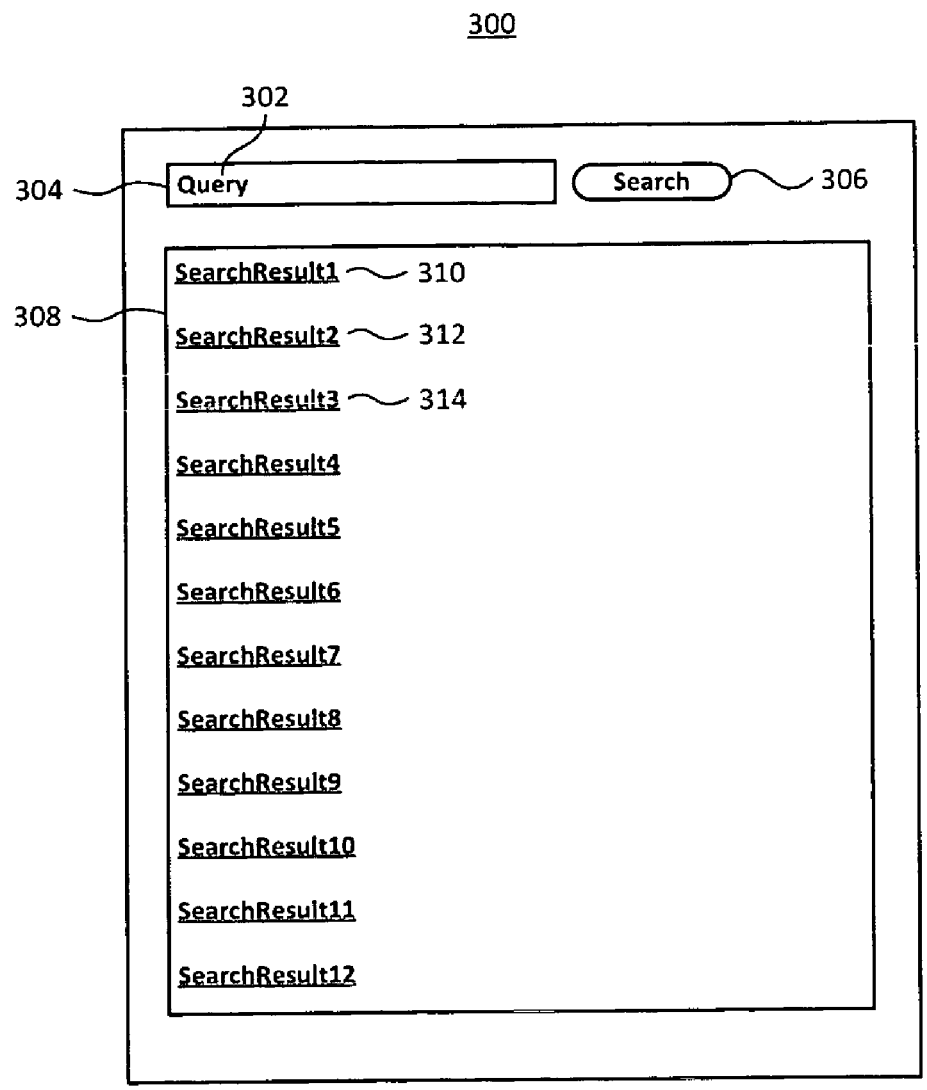
FIG. 3 shows an example of a user interface in accordance with some implementations of the present disclosure.

FIG. 3 shows an example user interface 300 in accordance with some implementations of the present disclosure. In some implementations, user interface 300 shows an example of ordering of search results. In some implementations, user interface 300 includes search query box 302 containing received search query "Query"304. In some implementations, search button 306 receives user input indicating a desired search. The search button may be activated, for example, using input received using a mouse or touchpad.

In some implementations, search results area 308 includes the search results related to search query "Query" 304. Search results area 108 may include, for example "SearchResult1" 310, "SearchResult2" 312, and "SearchResult3" 314. In some implementations, search results include, for example, a link to a web page, a brief description of the target of the link, contextual information related to the search result, an image related to the search result, video related to the search result, any other suitable information, or any combination thereof. In some implementations, contextual information includes a time stamp, a date stamp, historical information, a link to cached versions of content, a link to related content, a link to social medial content, an indicator of the relevance of a search result, any other suitable contextual information, or any combination thereof. In some implementations, search results area 308 includes other elements not shown, such as a scroll bar, "next page" links, statistical information, contextual information, other suitable content, or any combination thereof.

In some implementations, the order of search results "SearchResult1" 310, "SearchResult2" 312, and "SearchResult3" 314 may be based on score S determined using steps of flow diagram 200 of FIG. 2. It will be understood that the presentation of search results in user interface 300 is merely an example and that any suitable presentation of any suitable results may be used. In another example, results may be image thumbnail links, ordered horizontally based on score S. In another example, search results may include elements of a map and the search system uses score S to determine which elements to present on the map.

Figure 4:
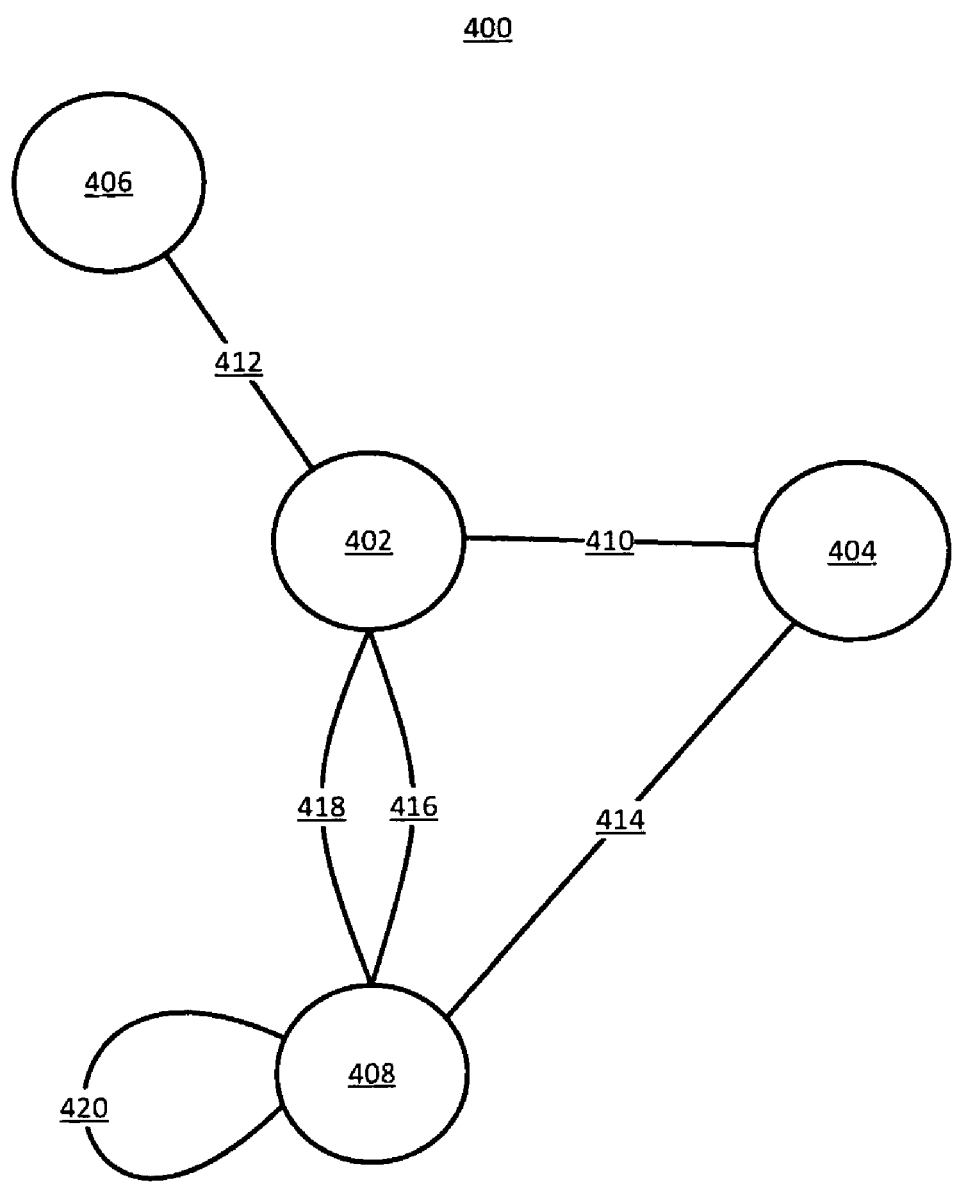
FIG. 4 shows an illustrative knowledge graph portion containing nodes and edges in accordance with some implementations of the present disclosure.
Figure 5:
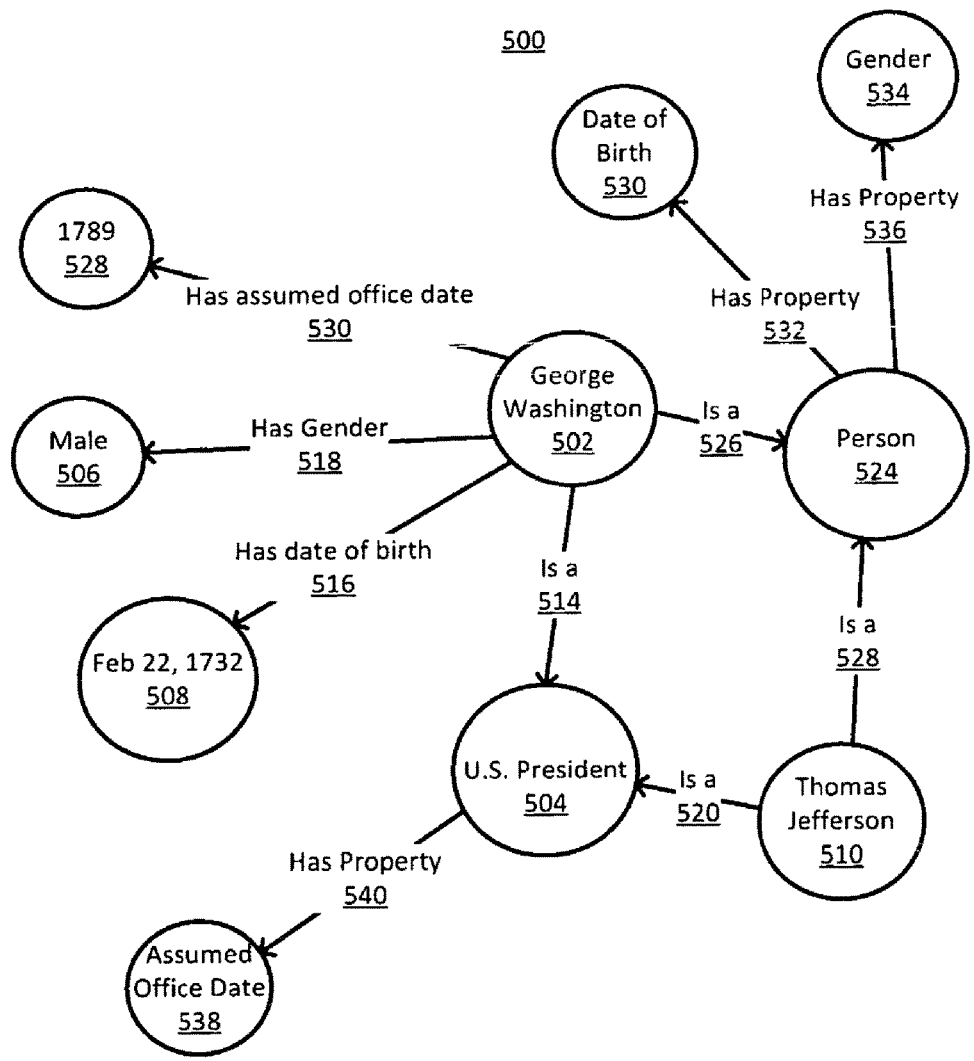
FIG. 5 shows an illustrative knowledge graph portion in accordance with some implementations of the present disclosure.
Figure 6:
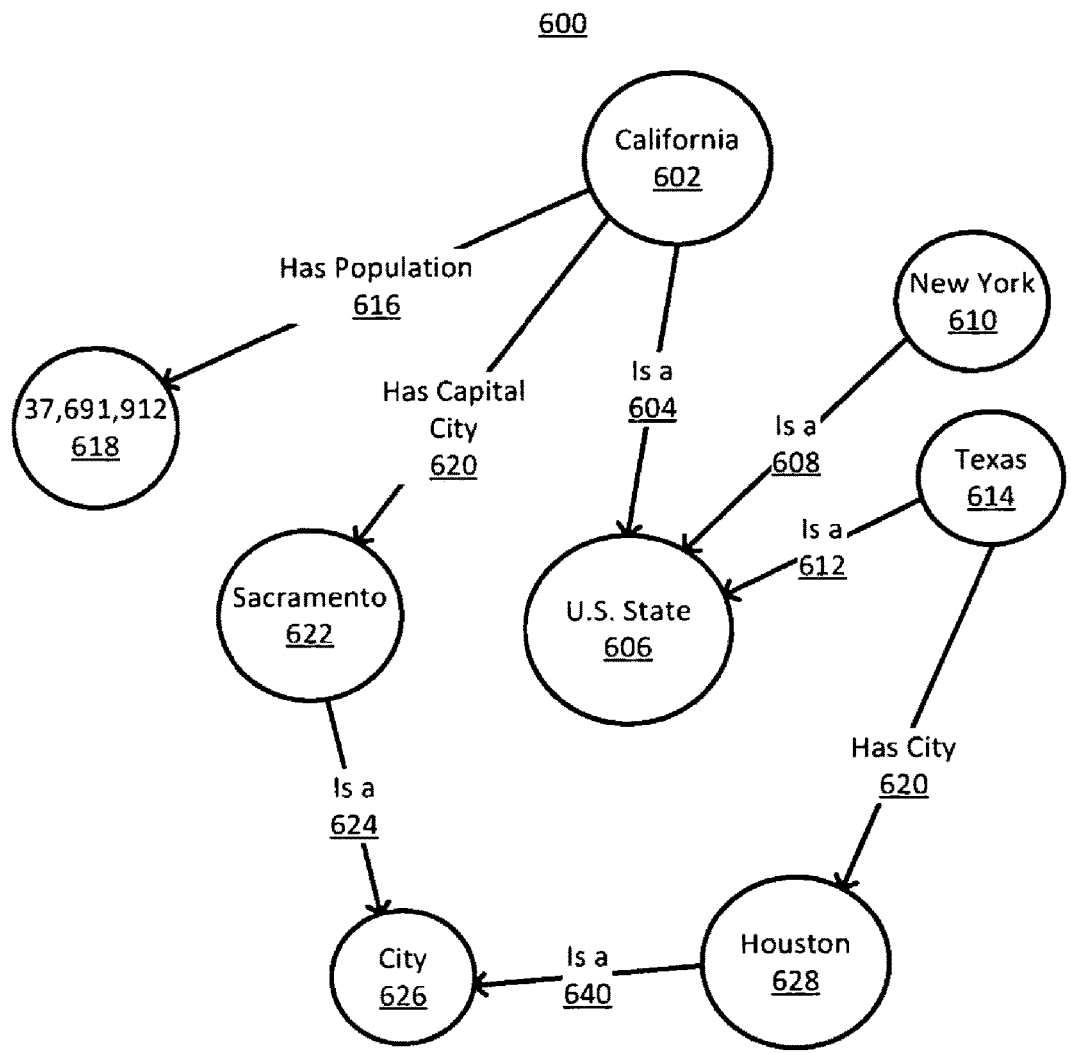
FIG. 6 shows an illustrative knowledge graph portion in accordance with some implementations of the present disclosure.

The following description and accompanying FIGS. 4-6 described an illustrative data structure referred to herein as a knowledge graph that may be used with some implementations of the present disclosure. It will be understood that the knowledge graph is merely an example of a data structure that may be used by the search system, and that any suitable data structure may be used.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. In some implementations, the edge, and thus the graph, may be directed, undirected, or both. In an example, directed edges form a unidirectional connection. In an example, undirected edges form bidirectional connections. In an example, a combination of both directed and undirected edges may be included in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

FIG. 4 shows illustrative knowledge graph 400 containing nodes and edges. Illustrative knowledge graph 400 includes nodes 402, 404, 406, and 408. Knowledge graph 400 includes edge 410 connecting node 402 and node 404. Knowledge graph 400 includes edge 412 connecting node 402 and node 406. Knowledge graph 400 includes edge 414 connecting node 404 and node 408. Knowledge graph 400 includes edge 416 and edge 418 connecting node 402 and node 408. Knowledge graph 400 includes edge 420 connecting node 408 to itself. Each aforementioned group of an edge and one or two distinct nodes may be referred to as a triple or 3-tuple. As illustrated, node 402 is directly connected by edges to three other nodes, while nodes 404 and 408 are directly connected by edges to two other nodes. Node 406 is connected by an edge to only one other node, and in some implementations, node 406 is referred to as a terminal node. As illustrated, nodes 402 and 408 are connected by two edges, indicating that the relationship between the nodes is defined by more than one property. As illustrated, node 408 is connected by edge 420 to itself, indicating that a node may relate to itself. While illustrative knowledge graph 400 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes.

In some implementations, entity references, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

A node of a knowledge graph may represent an entity. An entity is a thing or concept that is singular, unique, well-defined and distinguishable. For example, an entity may be a person, place, item, idea, abstract concept, concrete element, other suitable thing, or any combination thereof. Nodes are unique, in that no two nodes refer to the same thing or concept. Generally, entities include things or concepts represented linguistically by nouns. For example, the color "Blue," the city "San Francisco," and the imaginary animal "Unicorn" may each be entities. An entity generally refers to the concept of the entity. For example, the entity "New York City" refers to the physical city, and the knowledge graph uses a concept of the physical city as represented by, for example, an element in a data structure, the name of the entity, any other suitable element, or any combination thereof. It will be understood that in some implementations, the knowledge graph contains an entity reference, and not the physical embodiment of the entity. For example, an entity may be the physical embodiment of George Washington, while an entity reference is an abstract concept that refers to George Washington. In another example, the entity "New York City" refers to the physical city, and the knowledge graph uses a concept of the physical city as represented by, for example, an element in a data structure, the name of the entity, any other suitable element, or any combination thereof. Where appropriate, based on context, it will be understood that the term entity as used herein may correspond to an entity reference, and the term entity reference as used herein may correspond to an entity.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity reference. For example, entity type node Y may be connected to an entity reference node X by an "Is A" edge or link, discussed further below, such that the graph represents the information "The Entity X Is Type Y." For example, the entity reference node "George Washington" may be connected to the entity type node "President." An entity reference node may be connected to multiple entity type nodes, for example, "George Washington" may also be connected to entity type node "Person" and to entity type node "Military Commander." In another example, the entity type node "City" may be connected to entity reference nodes "New York City" and "San Francisco." In another example, the concept "Tall People," although incompletely defined, for example the knowledge graph may not necessarily include a strict definition of "tall," may exist as an entity type node in the knowledge graph anyway. In some implementations, the presence and meaning of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entities are associated with types in more than one domain. For example, the entity reference node "Benjamin Franklin" may be connected with the entity type node "Politician" in the domain "Government" as well as the entity type node "Inventor" in the domain "Business".

In some implementations, properties associated with entity reference nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity reference node "Knowledge Graph" that is connected to property nodes that describe a knowledge graph's properties such as "Has Nodes" and "Has Edges."

Specific values, in some implementations referred to as literals, may be associated with a particular entity reference in a terminal node by an edge defining the relationship. Literals may refer to values and/or strings of information. For example, literals may include dates, names, and/or numbers. In an example, the entity reference node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity reference nodes to X, Y, and Z, where each edge identifies the role of each respective connected entity reference node. In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the search system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington, "President Washington," and "President George Washington" may all be associated with a single entity, and thus with a single entity reference node in the knowledge graph. This may in some implementations provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity reference node related to the city "Philadelphia," an entity reference node related to the movie "Philadelphia," and an entity reference node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated types, by other entities connected to it by particular properties, by its name, by any other suitable information, or any combination thereof. These connections may be useful in disambiguating, for example, the node "Georgia" that is connected to the node "United States" may be understood represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity reference node may include or connect to; a unique identification reference, a list of entity types associated with the node, a list of differentiation aliases for the node, data associated with the entity reference, a textual description of the entity reference, links to a textual description of the entity reference, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity reference may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type," "Has Property," "Has Value," any other suitable statement, or any combination thereof. For example, the entity reference node of a particular person may be connected by a "Date Of Birth" edge to a terminal node containing a literal of his or her specific date of birth. In some implementations, the properties defined by edge connections of an entity reference may relate to nodes connected to the type of that entity reference. For example, the entity type node "Movie" may be connected to entity reference nodes "Actor" and "Director," and a particular movie may be connected by an edge property "Has Actor" to an entity reference node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity reference node "George Washington," which is connected to entity type node "Person" by an "Is A" edge, may also be connected to a literal "Feb. 22, 1732" by the edge "Has Date Of Birth." In some implementations, the entity reference node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity reference node "George Washington" may be connected by an "Is A" edge to the entity type node representing "Person," thus indicating an entity type of the entity reference, and may also be connected to a literal "Feb. 22, 1732" by the edge "Has Date Of Birth," thus defining a property of the entity reference. In this way, the knowledge graph defines both entity types and properties associated with a particular entity reference by connecting to other nodes. In some implementations, "Feb. 22, 1732" may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

FIG. 5 shows illustrative knowledge graph portion 500. Knowledge graph portion 500 includes information related to the entity reference "George Washington," represented by "George Washington" node 502. "George Washington" node 502 is connected to "U.S. President" entity type node 504 by "Is A" edge 514 with the semantic content "Is A," such that the 3-tuple defined by nodes 502 and 504 and the edge 514 contains the information "George Washington is a U.S. President." Similarly, the information "Thomas Jefferson Is A U.S. President" is represented by the tuple of "Thomas Jefferson" node 510, "Is A" edge 520, and "U.S. President" node 504. Knowledge graph portion 500 includes entity type nodes "Person" 524, and "U.S. President" node 504. The person type is defined in part by the connections from "Person" node 524. For example, the type "Person" is defined as having the property "Date Of Birth" by node 530 and edge 532, and is defined as having the property "Gender" by node 534 and edge 536. These relationships define in part a schema associated with the entity type "Person."

"George Washington" node 502 is shown in knowledge graph portion 500 to be of the entity types "Person" and "U.S. President," and thus is connected to nodes containing values associated with those types. For example, "George Washington" node 502 is connected by "Has Gender" edge 518 to "Male" node 506, thus indicating that "George Washington has gender "Male." Further, "Male" node 506 may be connected to the "Gender" node 534 indicating that "Male Is A Type Of Gender." Similarly, "George Washington" node 502 is be connected by "Has Date of Birth" edge 516 to "Feb. 22, 1732" node 508, thus indicating that "George Washington Has Date Of Birth Feb. 22, 1732." "George Washington" node 502 may also be connected to "1789" node 528 by "Has Assumed Office Date" edge 530.

Knowledge graph portion 500 also includes "Thomas Jefferson" node 510, connected by "Is A" edge 520 to entity type "U.S. President" node 504 and by "Is A" edge 528 to"Person" entity type node 524. Thus, knowledge graph portion 500 indicates that "Thomas Jefferson" has the entity types "U.S. President" and "Person." In some implementations, "Thomas Jefferson" node 510 is connected to nodes not shown in FIG. 5 referencing his date of birth, gender, and assumed office date.

It will be understood that knowledge graph portion 500 is merely an example and that it may include nodes and edges not shown. For example, "U.S. President" node 504 may be connected to all of the U.S. Presidents. "U.S. President" node 504 may also be connected to properties related to the entity type such as a duration of term, for example "4 Years," a term limit, for example "2 Terms," a location of office, for example "Washington D.C.," any other suitable data, or any combination thereof. For example, "U.S. President" node 504 is connected to "Assumed Office Date" node 538 by "Has Property" edge 540, defining in part a schema for the type "U.S. President." Similarly, "Thomas Jefferson" node 510 may be connected to any suitable number of nodes containing further information related to his illustrated entity type nodes "U.S. President," and "Person," and to other entity type nodes not shown such as "Inventor," "Vice President," and "Author." In a further example, "Person" node 524 may be connected to all entities in the knowledge graph with the type "Person." In a further example, "1789" node 528 may be connected to all events in the knowledge graph with the property of year "1789." "1789" node 528 is unique to the year 1789, and disambiguated from, for example, a book entitled "1789," not shown in FIG. 5, by its unique identification reference. In some implementations, "1789" node 528 is connected to the entity type node "Year." FIG. 6 shows illustrative knowledge graph portion 600. Knowledge graph portion 600 includes "California" node 602, which may also be associated with differentiation aliases such as, for example, "CA," "Calif.," "Golden State," any other suitable differentiation aliases, or any combination thereof. In some implementations, these differentiations are stored in "California" node 602. California is connected by "Is A" edge 604 to the "U.S. State" entity type node 606. "New York" node 610 and "Texas" node 614 are also connected to "U.S. State" node 606 by "Is A" edges 608 and 612, respectively. "California" node 602 is connected by "Has Capital City" edge 620 to "Sacramento" node 622, indicating the information that "California Has Capital City Sacramento." Sacramento node 622 is further connected by "Is A" edge 624 to the "City" entity type node 626. Similarly, "Texas" node 614 is connected by "Has City" edge 620 to "Houston" node 628, which is further connected to the "City" entity type node 626 by "Is A" edge 340. "California" node 602 is connected by "Has Population" edge 616 to node 618 containing the literal value "37,691,912." In an example, the particular value "37,691,912" may be periodically automatically updated by the knowledge graph based on an external website or other source of data. Knowledge graph portion 600 may include other nodes not shown. For example, "U.S. State" entity type node 606 may be connected to nodes defining properties of that type such as "Population" and "Capital City." These type-property relationships may be used to define other relationships in knowledge graph portion 600 such as "Has Population" edge 616 connecting entity reference node "California" 616 with terminal node 618 containing the literal defining the population of California. It will be understood that while knowledge graph portion 500 of FIG. 5 and knowledge graph portion 600 of FIG. 6 below show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 7:
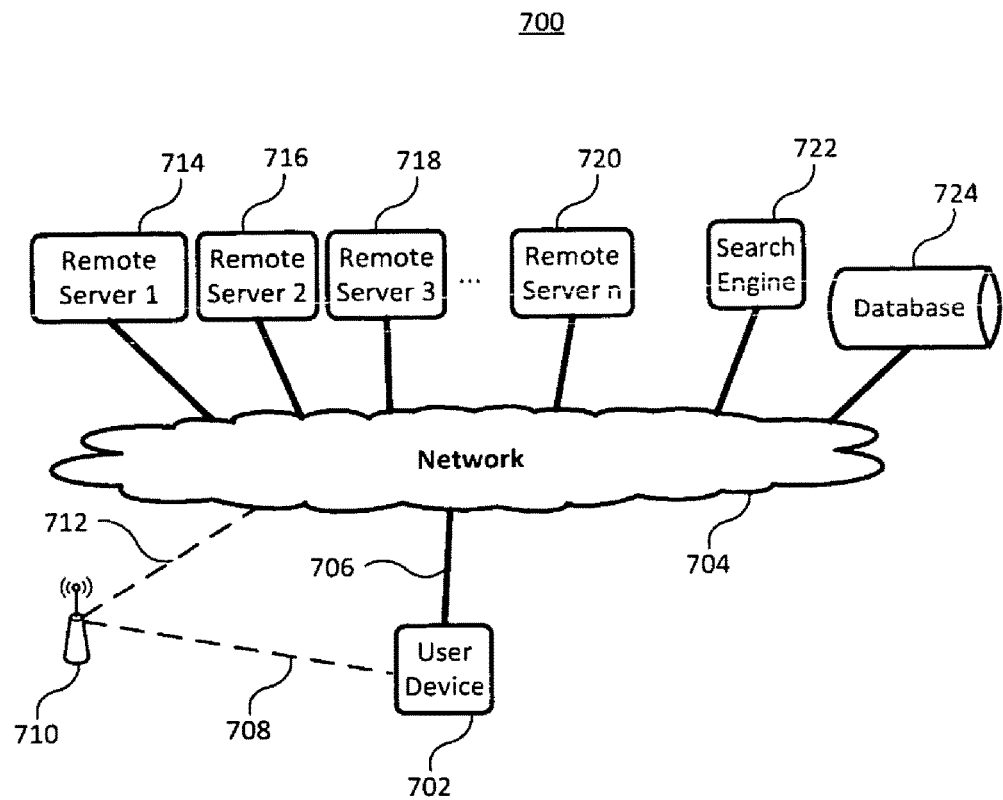
FIG. 7 shows an illustrative search system in accordance with some implementations of the present disclosure.
Figure 8:
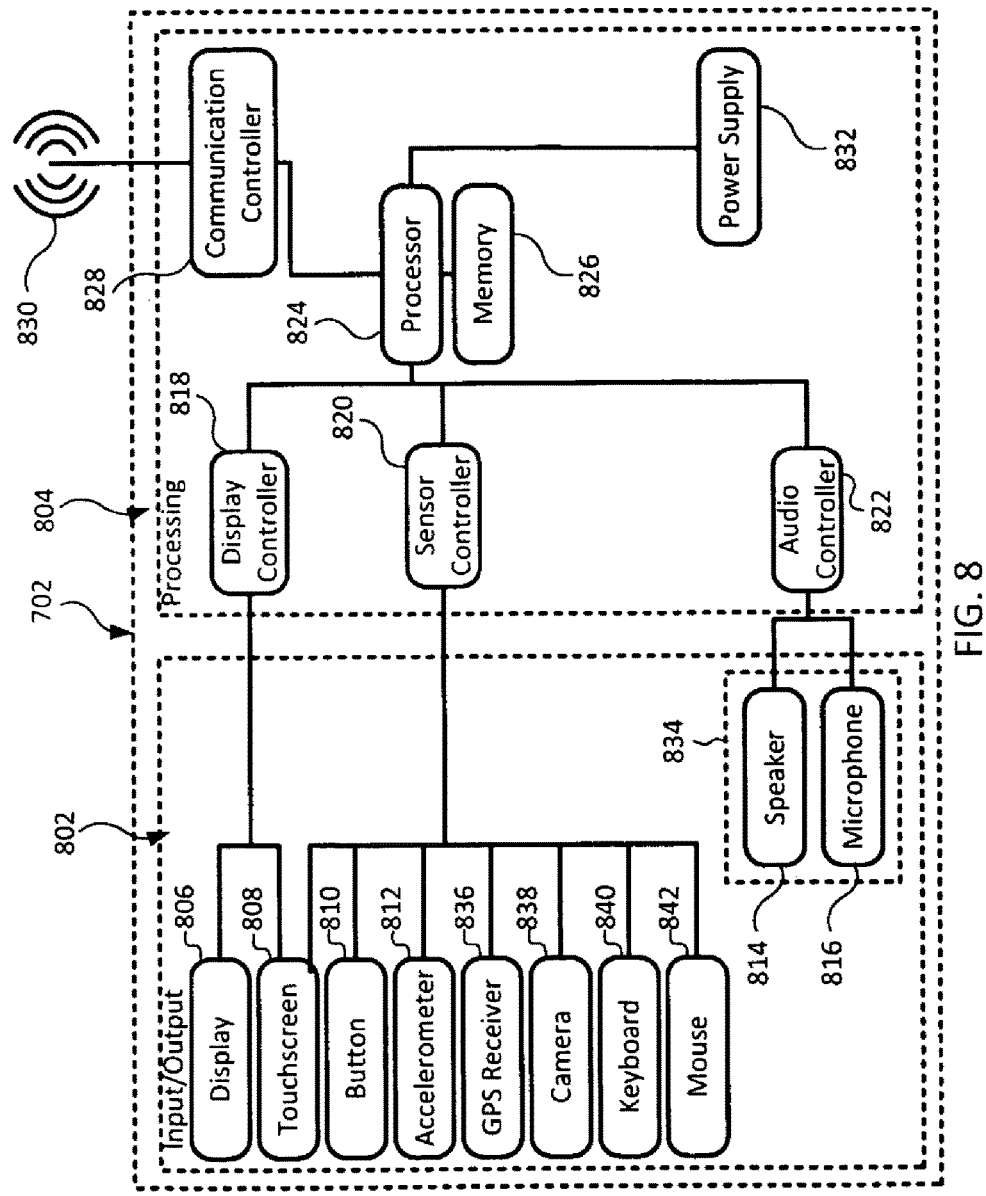
FIG. 8 is a block diagram of a user device in accordance with some implementations of the present disclosure.

The following description and accompanying FIGS. 7-8 describe illustrative computer systems that may be used in some implementations of the present disclosure. It will be understood that the knowledge graph and associated techniques may be implemented on any suitable computer or combination of computers.

FIG. 7 shows an illustrative search system in accordance with some implementations of the present disclosure. System 700 may include one or more user device 702. In some implementations, user device 702 may include a smartphone, tablet computer, desktop computer, laptop computer, personal digital assistant or PDA, portable audio player, portable video player, mobile gaming device, other suitable user device capable of providing content, or any combination thereof.

User device 702 may be coupled to network 704 directly through connection 705, through wireless repeater 710, by any other suitable way of coupling to network 704, or by any combination thereof. Network 704 may include the Internet, a dispersed network of computers and servers, a local network, a public intranet, a private intranet, other coupled computing systems, or any combination thereof.

User device 702 may be coupled to network 704 by wired connection 706. Connection 706 may include Ethernet hardware, coaxial cable hardware, DSL hardware, T-1 hardware, fiber optic hardware, analog phone line hardware, any other suitable wired hardware capable of communicating, or any combination thereof. Connection 706 may include transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof.

User device 702 may be wirelessly coupled to network 704 by wireless connection 708. In some implementations, wireless repeater 710 receives transmitted information from user device 702 by wireless connection 708 and communicates it with network 704 by connection 712. Wireless repeater 710 receives information from network 704 by connection 712 and communicates it with user device 702 by wireless connection 708. In some implementations, wireless connection 708 may include cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 712 may include Ethernet hardware, coaxial cable hardware, DSL hardware, T-1 hardware, fiber optic hardware, analog phone line hardware, wireless hardware, any other suitable hardware capable of communicating, or any combination thereof. Connection 712 may include wired transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof. Connection 712 may include may include wireless transmission techniques including cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 710 may include any number of cellular phone transceivers, network routers, network switches, communication satellites, other devices for communicating information from user device 702 to network 704, or any combination thereof. It will be understood that the arrangement of connection 706, wireless connection 708 and connection 712 is merely illustrative and that system 700 may include any suitable number of any suitable devices coupling user device 702 to network 704. It will also be understood that any user device 702, may be communicatively coupled with any user device, remote server, local server, any other suitable processing equipment, or any combination thereof, and may be coupled using any suitable technique as described above.

In some implementations, any suitable number of remote servers 714, 716, 718, 720, may be coupled to network 704. Remote servers may be general purpose, specific, or any combination thereof. One or more search engine servers 722 may be coupled to the network 704. In some implementations, search engine server 722 may include the knowledge graph, may include processing equipment configured to access the knowledge graph, may include processing equipment configured to receive search queries related to the knowledge graph, may include any other suitable information or equipment, or any combination thereof. One or more database servers 724 may be coupled to network 704. In some implementations, database server 724 may store the knowledge graph. In some implementations, where there is more than one knowledge graph, the more than one may be included in database server 724, may be distributed across any suitable number of database servers and general purpose servers by any suitable technique, or any combination thereof. It will also be understood that the search system may use any suitable number of general purpose, specific purpose, storage, processing, search, any other suitable server, or any combination.

FIG. 8 is a block diagram of a user device of the illustrative computer system of FIG. 7 in accordance with some implementations of the present disclosure. User device 702 may include input/output equipment 802 and processing equipment 804. Input/output equipment 802 may include display 806, touchscreen 808, button 810, accelerometer 812, global positions system or GPS receiver 836, camera 838, keyboard 840, mouse 842, and audio equipment 834 including speaker 814 and microphone 816. In some implementations, the equipment illustrated in FIG. 8 may be representative of equipment included in a smartphone user device. It will be understood that the specific equipment included in the illustrative computer system may depend on the type of user device. For example, the Input/output equipment 802 of a desktop computer may include a keyboard 840 and mouse 842 and may omit accelerometer 812 and GPS receiver 836. It will be understood that user device 702 may omit any suitable illustrated elements, and may include equipment not shown such as media drives, data storage, communication devices, display devices, processing equipment, any other suitable equipment, or any combination thereof.

In some implementations, display 806 may include a liquid crystal display, light emitting diode display, organic light emitting diode display, amorphous organic light emitting diode display, plasma display, cathode ray tube display, projector display, any other suitable type of display capable of displaying content, or any combination thereof. Display 806 may be controlled by display controller 818 or by processor 824 in processing equipment 804, by processing equipment internal to display 806, by other controlling equipment, or by any combination thereof. In some implementations, display 806 may display data from a knowledge graph.

Touchscreen 808 may include a sensor capable of sensing pressure input, capacitance input, resistance input, piezoelectric input, optical input, acoustic input, any other suitable input, or any combination thereof. Touchscreen 808 may be capable of receiving touch-based gestures. Received gestures may include information relating to one or more locations on the surface of touchscreen 808, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 808 may be optically transparent and located above or below display 806. Touchscreen 808 may be coupled to and controlled by display controller 818, sensor controller 820, processor 824, any other suitable controller, or any combination thereof. In some implementations, touchscreen 808 may include a virtual keyboard capable of receiving, for example, a search query used to identify data in a knowledge graph.

In some embodiments, a gesture received by touchscreen 808 may cause a corresponding display element to be displayed substantially concurrently, e.g., immediately following or with a short delay, by display 806. For example, when the gesture is a movement of a finger or stylus along the surface of touchscreen 808, the search system may cause a visible line of any suitable thickness, color, or pattern indicating the path of the gesture to be displayed on display 806. In some implementations, for example, a desktop computer using a mouse, the functions of the touchscreen may be fully or partially replaced using a mouse pointer displayed on the display screen.

Button 810 may be one or more electromechanical push-button mechanism, slide mechanism, switch mechanism, rocker mechanism, toggle mechanism, other suitable mechanism, or any combination thereof. Button 810 may be included in touchscreen 808 as a predefined region of the touchscreen, e.g., soft keys. Button 810 may be included in touchscreen 808 as a region of the touchscreen defined by the search system and indicated by display 806. Activation of button 810 may send a signal to sensor controller 820, processor 824, display controller 820, any other suitable processing equipment, or any combination thereof. Activation of button 810 may include receiving from the user a pushing gesture, sliding gesture, touching gesture, pressing gesture, time-based gesture, e.g. based on the duration of a push, any other suitable gesture, or any combination thereof.

Accelerometer 812 may be capable of receiving information about the motion characteristics, acceleration characteristics, orientation characteristics, inclination characteristics and other suitable characteristics, or any combination thereof, of user device 702. Accelerometer 812 may be a mechanical device, microelectromechanical or MEMS device, nanoelectromechanical or NEMS device, solid state device, any other suitable sensing device, or any combination thereof. In some implementations, accelerometer 812 may be a 3-axis piezoelectric microelectromechanical integrated circuit which is configured to sense acceleration, orientation, or other suitable characteristics by sensing a change in the capacitance of an internal structure. Accelerometer 812 may be coupled to touchscreen 808 such that information received by accelerometer 812 with respect to a gesture is used at least in part by processing equipment 804 to interpret the gesture.

Global positioning system or GPS receiver 836 may be capable of receiving signals from global positioning satellites. In some implementations, GPS receiver 836 may receive information from one or more satellites orbiting the earth, the information including time, orbit, and other information related to the satellite. This information may be used to calculate the location of user device 702 on the surface of the earth. GPS receiver 836 may include a barometer, not shown, to improve the accuracy of the location. GPS receiver 836 may receive information from other wired and wireless communication sources regarding the location of user device 702. For example, the identity and location of nearby cellular phone towers may be used in place of, or in addition to, GPS data to determine the location of user device 702.

Camera 838 may include one or more sensors to detect light. In some implementations, camera 838 may receive video images, still images, or both. Camera 838 may include a charged coupled device or CCD sensor, a complementary metal oxide semiconductor or CMOS sensor, a photocell sensor, an IR sensor, any other suitable sensor, or any combination thereof. In some implementations, camera 838 may include a device capable of generating light to illuminate a subject, for example, an LED light. Camera 838 may communicate information captured by the one or more sensor to sensor controller 820, to processor 824, to any other suitable equipment, or any combination thereof. Camera 838 may include lenses, filters, and other suitable optical equipment. It will be understood that user device 702 may include any suitable number of camera 838.

Audio equipment 834 may include sensors and processing equipment for receiving and transmitting information using acoustic or pressure waves. Speaker 814 may include equipment to produce acoustic waves in response to a signal. In some implementations, speaker 814 may include an electroacoustic transducer wherein an electromagnet is coupled to a diaphragm to produce acoustic waves in response to an electrical signal. Microphone 816 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by user device 702.

Speaker 814 and microphone 816 may be contained within user device 702, maybe remote devices coupled to user device 702 by any suitable wired or wireless connection, or any combination thereof.

Speaker 814 and microphone 816 of audio equipment 834 may be coupled to audio controller 822 in processing equipment 804. This controller may send and receive signals from audio equipment 834 and perform pre-processing and filtering steps before transmitting signals related to the input signals to processor 824. Speaker 814 and microphone 816 may be coupled directly to processor 824. Connections from audio equipment 834 to processing equipment 804 may be wired, wireless, other suitable arrangements for communicating information, or any combination thereof.

Processing equipment 804 of user device 702 may include display controller 818, sensor controller 820, audio controller 822, processor 824, memory 826, communication controller 828, and power supply 832.

Processor 824 may include circuitry to interpret signals input to user device 702 from, for example, touchscreen 808 and microphone 816. Processor 824 may include circuitry to control the output to display 806 and speaker 814. Processor 824 may include circuitry to carry out instructions of a computer program. In some implementations, processor 824 may be an integrated electronic circuit based, capable of carrying out the instructions of a computer program and include a plurality of inputs and outputs.

Processor 824 may be coupled to memory 826. Memory 826 may include random access memory or RAM, flash memory, programmable read only memory or PROM, erasable programmable read only memory or EPROM, magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 818, sensor controller 820, and audio controller 822, as have been described above, may be fully or partially implemented as discrete components in user device 702, fully or partially integrated into processor 824, combined in part or in full into combined control units, or any combination thereof.

Communication controller 828 may be coupled to processor 824 of user device 702. In some implementations, communication controller 828 may communicate radio frequency signals using antenna 830. In some implementations, communication controller 828 may communicate signals using a wired connection, not shown. Wired and wireless communications communicated by communication controller 828 may use Ethernet, amplitude modulation, frequency modulation, bitstream, code division multiple access or COMA, global system for mobile communications or GSM, general packet radio service or GPRS, satellite, infrared, Bluetooth, Wi-Fi, WiMax, any other suitable communication configuration, or any combination thereof. The functions of communication controller 828 may be fully or partially implemented as a discrete component in user device 702, may be fully or partially included in processor 824, or any combination thereof. In some implementations, communication controller 828 may communicate with a network such as network 704 of FIG. 7 and may receive information from a knowledge graph stored, for example, in database 724 of FIG. 7.

Power supply 832 may be coupled to processor 824 and to other components of user device 702. Power supply 832 may include a lithium-polymer battery, lithium-ion battery, NiMH battery, alkaline battery, lead-acid battery, fuel cell, solar panel, thermoelectric generator, any other suitable power source, or any combination thereof. Power supply 832 may include a hard wired connection to an electrical power source, and may include electrical equipment to convert the voltage, frequency, and phase of the electrical power source input to suitable power for user device 702. In some implementations of power supply 832, a wall outlet may provide 720 volts, 60 Hz alternating current or AC. A circuit of transformers, resistors, inductors, capacitors, transistors, and other suitable electronic components included in power supply 832 may convert the 120V AC from a wall outlet power to 5 volts at 0 Hz, e.g., using direct current. In some implementations of power supply 832, a lithium-ion battery including a lithium metal oxide-based cathode and graphite-based anode may supply 3.7V to the components of user device 702. Power supply 832 may be fully or partially integrated into user device 702, or may function as a stand-alone device. Power supply 832 may power user device 702 directly, may power user device 702 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A method implemented using one or more computers, the method comprising:
   receiving a search query from a user device;
   obtaining, from a knowledge graph and based on the search query, a first search result and a second search result;
   determining a plurality of first metrics associated with the first search result obtained from the knowledge graph, wherein the plurality of first metrics is indicative of the relevance of the first search result, wherein the plurality of first metrics is determined at least in part from the knowledge graph, and wherein at least one of the plurality of first metrics is independent of the search query;
   determining a plurality of second metrics associated with the second search result obtained from the knowledge graph, wherein the plurality of second metrics is indicative of the relevance of the second search result, wherein the plurality of second metrics is determined at least in part from the knowledge graph, and wherein at least one of the plurality of second metrics is independent of the search query;
   determining a first entity type associated with the first search result, wherein the first entity type is determined at least in part from the knowledge graph;
   determining a second entity type associated with the second search result, wherein the second entity type is determined at least in part from the knowledge graph, and wherein the second entity type is distinct from the first entity type;
   determining a first weight for each first metric of the plurality of first metrics based at least in part on the first entity type associated with the first search result, wherein determining the first weight for each of the plurality of first metrics comprises:
      determining, for each of the plurality of first metrics, a corresponding one of the first weights;
   determining a second weight for each second metric of the plurality of second metrics based at least in part on the second entity type associated with the second search result, wherein the second weights are distinct from the first weights, and wherein determining the second weight for each of the plurality of second metrics comprises:
      determining, for each of the plurality of second metrics, a corresponding one of the second weights;
   determining a first score for the first search result based on the plurality of first metrics and the first weights for the plurality of first metrics, including determining the first score based on modifying each of the plurality of first metrics by a corresponding one of the first weights;
   determining a second score for the second search result based on the plurality of second metrics and the second weights for the plurality of second metrics, including determining the second score based on modifying each of the plurality of second metrics by a corresponding one of the second weights;
   ranking the first search result and the second search result based at least in part on the first score and the second score;
   selecting, based on the ranking of the first search result and the second search result, a user interface of the user device to provide the first search result and the second search result for presentation; and
   providing, via the selected user interface of the user device in response to the search query, the first search result and the second search result for presentation based at least in part on the ranking.

2. The method of claim 1, wherein determining the first weight for each first metric of the plurality of first metrics comprises:
   determining a domain in the knowledge graph associated with the first entity type; and
   determining weights associated with the domain.

3. The method of claim 1, wherein the plurality of first metrics comprises a relatedness metric.

4. The method of claim 1, wherein the plurality of first metrics comprises a notable type metric.

5. The method of claim 1, wherein the plurality of first metrics comprises a contribution metric.

6. The method of claim 1, wherein the plurality of first metrics comprises a prize metric.

7. The method of claim 1, wherein the first score is determined as the summation of the respective products of the first metrics and the first weights.

8. The method of claim 1, further comprising ordering the first search result and the second search result for presentation based on the ranking.

9. The method of claim 1, further comprising applying a weighting function to one or more of the first metrics.

10. A system comprising:
a database comprising a knowledge graph; and
one or more computers configured to perform operations comprising:
receiving a search query from a user device;
obtaining, from a knowledge graph and based on the search query, a first search result and a second search result;
determining a plurality of first metrics associated with the first search result obtained from the knowledge graph, wherein the plurality of first metrics is indicative of the relevance of the first search result, wherein the plurality of first metrics is determined at least in part from the knowledge graph, and wherein at least one of the plurality of first metrics is independent of the search query;
determining a plurality of second metrics associated with the second search result obtained from the knowledge graph, wherein the plurality of second metrics is indicative of the relevance of the second search result, wherein the plurality of second metrics is determined at least in part from the knowledge graph, and wherein at least one of the plurality of second metrics is independent of the search query;
determining a first entity type associated with the first search result, wherein the first entity type is determined at least in part from the knowledge graph;
determining a second entity type associated with the second search result, wherein the second entity type is determined at least in part from the knowledge graph and wherein the second entity type is distinct from the first entity type;
determining a first weight for each first metric of the plurality of first metrics based at least in part on the first entity type associated with the first search result, wherein determining the first weight for each of the plurality of first metrics comprises:
determining, for each of the plurality of first metrics, a corresponding one of the first weights;
determining a second weight for each second metric of the plurality of second metrics based at least in part on the second entity type associated with the second search result, wherein the second weights are distinct from the first weights and wherein determining the second weight for each of the plurality of second metrics comprises:
determining, for each of the plurality of second metrics, a corresponding one of the second weights;
determining a first score for the first search result based on the plurality of first metrics and the first weights for the plurality of first metrics, including determining the first score based on modifying each of the plurality of first metrics by a corresponding one of the first weights;
determining a second score for the second search result based on the plurality of second metrics and the second weights for the plurality of second metrics, including determining the second score based on modifying each of the plurality of second metrics by a corresponding one of the second weights;
ranking the first search result and the second search result based at least in part on the first score and the second score; and
providing, to the user device in response to the search query, the first search result and the second search result for presentation based at least in part on the ranking.

11. The system of claim 10, wherein determining the first weight for each first metric of the plurality of first metrics comprises:
determining a domain in the knowledge graph associated with the first entity type; and
determining weights associated with the domain.

12. The system of claim 10, wherein the plurality of first metrics comprises a relatedness metric.

13. The system of claim 10, wherein the plurality of first metrics comprises a notable type metric.

14. The system of claim 10, wherein the plurality of first metrics comprises a contribution metric.

15. The system of claim 10, wherein the plurality of first metrics comprises a prize metric.

16. The system of claim 10, wherein the first score is determined as the summation of the products of the respective first metrics and the first weights.

17. The system of claim 10, wherein the one or more computers are configured to perform operations further comprising ordering the first search result and the second search result for presentation based on the ranking.

18. The system of claim 10, wherein the one or more computers are configured to perform operations further comprising applying a weighting function to one or more of the first metrics.

19. A non-transitory computer-readable medium having computer program instructions recorded thereon for:
receiving a search query from a user device;
obtaining, from a knowledge graph and based on the search query, a first search result and a second search result;
determining a plurality of first metrics associated with the first search result obtained from the knowledge graph, wherein the plurality of first metrics is indicative of the relevance of the first search result, wherein the plurality of first metrics is determined at least in part from the knowledge graph, and wherein at least one of the plurality of first metrics is independent of the search query;
determining a plurality of second metrics associated with the second search result obtained from the knowledge graph, wherein the plurality of second metrics is indicative of the relevance of the second search result, wherein the plurality of second metrics is determined at least in part from the knowledge graph, and wherein at least one of the plurality of second metrics is independent of the search query;
determining a first entity type associated with the first search result, wherein the first entity type is determined at least in part from the knowledge graph;

determining a second entity type associated with the second search result, wherein the second entity type is determined at least in part from the knowledge graph, and wherein the second entity type is distinct from the first entity type;

determining a first weight for each first metric of the plurality of first metrics based at least in part on the first entity type associated with the first search result, wherein determining the first weight for each of the plurality of first metrics comprises:

determining, for each of the plurality of first metrics, a corresponding one of the first weights;

determining a second weight for each second metric of the plurality of second metrics based at least in part on the second entity type associated with the second search result, wherein the second weights are distinct from the first weights and wherein determining the second weight for each of the plurality of second metrics comprises:

determining, for each of the plurality of second metrics, a corresponding one of the second weights;

determining a first score for the first search result based on the plurality of first metrics and the first weights for the plurality of first metrics, including determining the first score based on modifying each of the plurality of first metrics by a corresponding one of the first weights;

determining a second score for the second search result based on the plurality of second metrics and the second weights for the plurality of second metrics, including determining the second score based on modifying each of the plurality of second metrics by a corresponding one of the second weights;

ranking the first search result and the second search result based at least in part on the first score and the second score;

selecting, based on the ranking of the first search result and the second search result, a user interface of the user device to provide the first search result and the second search result for presentation; and providing, via the selected user interface of the user device in response to the search query, the first search result and the second search result for presentation based at least in part on the ranking.

20. The non-transitory computer-readable medium of claim 19, wherein determining the first weight for each first metric of the plurality of first metrics comprises:

determining a domain in the knowledge graph associated with the first entity type; and determining weights associated with the domain.

21. The non-transitory computer-readable medium of claim 19, wherein the plurality of first metrics comprises a relatedness metric.

22. The non-transitory computer-readable medium of claim 19, wherein the plurality of first metrics comprises a notable type metric.

23. The non-transitory computer-readable medium of claim 19, wherein the plurality of first metrics comprises a contribution metric.

24. The non-transitory computer-readable medium of claim 19, wherein the plurality of first metrics comprises a prize metric.

25. The non-transitory computer-readable medium of claim 19, wherein the first score is determined as the summation of the respective products of the first metrics and the first weights.

26. The non-transitory computer-readable medium of claim 19, further comprising ordering the first search result and the second search result for presentation based on the ranking.

27. The non-transitory computer-readable medium of claim 19, further comprising applying a weighting function to one or more of the first metrics.

* * * * *